US011211707B1

(12) United States Patent
Pourbeyram Kaleibar et al.

(10) Patent No.: US 11,211,707 B1
(45) Date of Patent: Dec. 28, 2021

(54) APPARATUS FOR BROADBAND WAVELENGTH CONVERSION OF DUAL-POLARIZATION PHASE-ENCODED SIGNAL

(71) Applicant: LYTELOOP TECHNOLOGIES, LLC, Great Neck, NY (US)

(72) Inventors: Hamed Pourbeyram Kaleibar, Bayside, NY (US); Yu-Hsiang Cheng, Basking Ridge, NJ (US); Michael Etienne, West Babylon, NY (US); Ohad Harlev, Closter, NJ (US); Dipayan Datta Choudhary, Brooklyn, NY (US)

(73) Assignee: LyteLoop Technologies, LLC, Great Neck, NY (US)

( * ) Notice: Subject to any disclaimer, the term of this patent is extended or adjusted under 35 U.S.C. 154(b) by 0 days.

(21) Appl. No.: 17/145,924

(22) Filed: Jan. 11, 2021

Related U.S. Application Data

(60) Provisional application No. 63/113,349, filed on Nov. 13, 2020.

(51) Int. Cl.
*H01Q 5/28* (2015.01)
*H01Q 5/55* (2015.01)
(Continued)

(52) U.S. Cl.
CPC ............. *H01Q 5/28* (2015.01); *G02F 1/3534* (2013.01); *G02F 2/006* (2021.01); *H01Q 5/55* (2015.01)

(58) Field of Classification Search
None
See application file for complete search history.

(56) References Cited

U.S. PATENT DOCUMENTS 6,259,552 B1 7/2001 Boffi et al.
6,947,206 B2 9/2005 Tsadka et al.
(Continued)

FOREIGN PATENT DOCUMENTS

CA 2553437 A1 7/2006
WO 2009059598 A1 5/2009
(Continued)

OTHER PUBLICATIONS

Certified U.S. Appl. No. 60/499,536, filed Sep. 2, 2003.
(Continued)

*Primary Examiner* — Ashok Patel
(74) *Attorney, Agent, or Firm* — Amster, Rothstein & Ebenstein LLP

(57) ABSTRACT

An apparatus and method for wavelength conversion of a signal, for example, a dual-polarization signal, is disclosed. The apparatus implements a single-loop counter-propagating wavelength conversion scheme which provides both up-conversion and down-conversion of the signal within the same loop. Nonlinear wavelength conversion devices in the loop provide both up-conversion and down-conversion of the polarization components of the signal within the loop depending on whether the polarization component travels through the nonlinear conversion device in a clockwise or a counter-clockwise direction. The wavelength-converted signal is available to be extracted from the wavelength-conversion loop. An all-optical wavelength-division multiplexing transponder based on the wavelength-conversion scheme is also disclosed.

26 Claims, 12 Drawing Sheets

(51) Int. Cl.
*G02F 1/35* (2006.01)
*G02F 2/00* (2006.01)

(56) References Cited

U.S. PATENT DOCUMENTS

| | | | |
|---|---|---|---|
| 6,972,894 | B2 | 12/2005 | Bjarklev et al. |
| 7,068,894 | B2 | 6/2006 | Prucnal et al. |
| 7,092,145 | B2 | 8/2006 | Takagi |
| 7,394,990 | B1 | 7/2008 | Yee |
| 7,433,561 | B2 | 10/2008 | Shahar |
| 8,027,589 | B2 | 9/2011 | Song et al. |
| 9,000,347 | B2 | 4/2015 | Woodward et al. |
| 9,191,117 | B2 | 11/2015 | Alexander et al. |
| 9,653,872 | B2 | 5/2017 | Di Teodoro et al. |
| 10,274,809 | B1 | 4/2019 | Pomeranz |
| 2005/0175354 | A1 | 8/2005 | Vieira |
| 2005/0244159 | A1 | 11/2005 | Chowdhury |
| 2007/0201789 | A1 | 8/2007 | Bernasconi |
| 2009/0310968 | A1* | 12/2009 | Kawanishi .......... G02F 2/02 398/79 |
| 2011/0013911 | A1 | 1/2011 | Alexander et al. |
| 2012/0236894 | A1 | 9/2012 | Onose |
| 2013/0022358 | A1 | 1/2013 | Galarneau |
| 2014/0016186 | A1 | 1/2014 | Fujikawa |
| 2018/0088215 | A1 | 3/2018 | Halbritter et al. |
| 2018/0120157 | A1 | 5/2018 | Kaufmann et al. |
| 2020/0057142 | A1 | 2/2020 | Wang |
| 2020/0348578 | A1 | 11/2020 | Nagano |
| 2026/0386676 | | 12/2020 | Stentz |

FOREIGN PATENT DOCUMENTS

| | | |
|---|---|---|
| WO | 2012132866 A1 | 10/2012 |
| WO | 2018172115 A1 | 9/2018 |
| WO | 2019197242 A1 | 10/2019 |

OTHER PUBLICATIONS

S. R. Nuccio, Z. Bakhtiari, O. F. Yilmaz, and A. E. Willner, "λ-conversion of 160-Gbit/s PDM 16-QAM using a single periodically-poled lithium niobate waveguide," Optics InfoBase Conference Papers, pp. 20-22 (2011), doi: 10.1364/ofc.2011.owg5.

P. Martelli, P. Boffi, M. Ferrario, L. Marazzi, P. Parolari, and R. Siano, "All-Optical Wavelength Conversion of a 100-Gb/s Polarization-Multiplexed Signal," Optics Express, vol. 17, No. 20, pp. 179-181 (2009).

Hao Hu, Rahman Nouroozi, Reinhold Ludwig, Carsten Schmidt-Langhorst, Hubertus Suche, Wolfgang Sohler, and and C. Schubert, "110 km transmission of 160 Gbit/s RZ-DQPSK signals by midspan polarization-insensitive optical phase conjugation in a Ti:PPLN waveguide," Optics Letters, vol. 35, No. 17, p. 2867 (2010), doi: 10.1364/ofc.2011.owg5.

F. Da Ros et al., "Wavelength conversion of QAM signals in a low loss CMOS compatible spiral waveguide," APL Photonics, vol. 2, No. 4 (2017), doi: 10.1063/1.4978945.

V. Pusino et al., "Wavelength conversion of real-time 100-Gb/s POLMUX RZ-DQPSK," Conf. Opt. Fiber Commun. Tech. Dig. Ser., pp. 25-27 (2009), doi: 10.1364/ofc.2009.oths3.

X. Jiang, J. Wang, C. Gao, J. Xu, and H. Wan, "All-optical NRZ wavelength conversion using a Sagnac loop with optimized SOA characteristics," Journal of Semiconductors, vol. 36, No. 1 (2015), doi: 10.1088/1674-4926/36/1/014013.

Jiaqin Qian, Tao Yang, Mingyi Gao, Lian Xiang and Gangxiang Shen, "Seamless all-optical bidirectional wavelength converter," 2016 15th International Conference on Optical Communications and Networks (ICOCN), Hangzhou, 2016, pp. 1-3, doi: 10.1109/ICOCN.2016.7875743.

\* cited by examiner

APPARATUS FOR BROADBAND WAVELENGTH CONVERSION OF DUAL-POLARIZATION PHASE-ENCODED SIGNAL

CROSS-REFERENCE TO RELATED APPLICATIONS

The present non-provisional patent application claims the benefit of and priority to U.S. Provisional Patent Application No. 63/113,349, filed Nov. 13, 2020, the entire contents of which are incorporated herein by reference.

FIELD OF INVENTION

The present invention relates to the conversion of electromagnetic fields from one wavelength (frequency) to another wavelength (frequency). In particular, the present invention relates to an apparatus and method for wavelength (frequency) conversion using a closed-loop design for back-and-forth conversion (i.e., both up-conversion and down-conversion) of an electromagnetic wave for broadband applications without the need for broadband components.

BACKGROUND OF THE INVENTION

Wavelength conversion of an electromagnetic wave that is used to carry information is often desired to take advantage of available bandwidth, spectrum and in some cases minimize wavelength collision or contention in optical networks. In this particular application, "Up-conversion" refers to a process by which the frequency of a signal is shifted up (i.e., increased). In view of the inverse relationship between the frequency of an electromagnetic wave signal and its wavelength, the wavelength of an up-converted signal is decreased. "Down-conversion" refers to a process by which the frequency of a signal is shifted down (i.e., decreased). In view of the inverse relationship between the frequency of an electromagnetic wave signal and its wavelength, the wavelength of a down-converted signal is increased. Throughout this disclosure, wavelength conversion and frequency conversion will be used interchangeably.

The wavelength conversion of an electromagnetic field carrying information and with different attributes (polarization, spatial modes, phase and/or amplitude modulation, etc.) is a cumbersome and tedious process. As waves are converted from one frequency to another, signal integrity is of paramount interest. Of particular importance are attributes such as polarization crosstalk, polarization group delay, timing delay, phase delay, frequency jitter, etc.

For example, in phase-encoded dual-polarization systems, a small amount of polarization crosstalk can lead to severe signal degradation leading to an increased bit-error-rate. As a result, wavelength conversion of a dual-polarization signal requires a polarization-independent wavelength conversion device with minimal to zero polarization crosstalk. In the absence of such devices, a wavelength conversion scheme that separates a certain attribute (such as polarization), performs the conversion, and accurately recombines the separated attributes is needed.

In the case of a dual-polarization signal, for example, independent wavelength conversion is required for each polarization component of the signal. One solution is to separately convert the wavelength of each polarization component of the signal and then to combine the separately converted polarization components. In this approach, which is referred to as the "polarization diversity" scheme, typically each wavelength conversion is done using a separate yet similar non-linear medium, e.g., a periodically poled lithium niobate ("PPLN") crystal broadly referred to as one example of a wavelength conversion component. Also, other methods could be employed to perform wavelength conversion. As shown in FIG. 1, in a polarization diversity scheme 100, the polarization components 106 and 104 of a dual-polarization signal 102 having a wavelength $\lambda_1$ are separated by a polarization demultiplexer (e.g. polarizing beam splitter) 108 and each polarization component 104, 106 is converted to a different wavelength $\lambda_2$ by a respective wavelength conversion component such as a PPLN 110, 112. The wavelength-converted polarization components 114, 116 are then combined by beam polarization combiner 118 into a dual-polarization optical signal 120 which has a wavelength $\lambda_2$.

A similar process is used to convert the dual-polarization optical signal 120 from its wavelength $\lambda_2$ back to a dual-polarization optical signal having a wavelength $\lambda_1$. The polarization components 122 and 124 of the dual-polarization optical signal 120 are separated by a polarization beam splitter 126 and each polarization component 122, 124 is converted back to wavelength $\lambda_1$ by a respective wavelength conversion component(s) 128, 130. The wavelength-converted polarization components 132, 134 are then combined by beam polarization combiner 136 into a dual-polarization optical signal 138 which has a wavelength $\lambda_1$.

One main drawback of the polarization diversity scheme is that each polarization component experiences a different optical path with different optical components (i.e., different wavelength conversion component(s)). Hence, the optical path lengths for the two polarization components are unequal, which makes it necessary to compensate for a relative delay between the two polarization components. The different optical path lengths also cause the polarization diversity approach to be prone to distortion and instability caused by environmental factors. The polarization diversity approach further requires four wavelength conversion component(s).

A well-known solution for such problems is to use a counter-propagating (also referred to as bi-correctional) scheme, which could be free-space or in a waveguide. In the counter-propagating scheme, both polarization components propagate within the same optical path and in different directions and are converted inside the same wavelength converting component(s). Accordingly, the benefit of the counter-propagating scheme is that it provides a similar path length with shared components (i.e., the same waveguides, fibers, nonlinear crystals) for both polarization components of the electromagnetic field, which results in a minimal delay between the two polarization components.

The main drawback of the counter-propagating scheme as shown in FIG. 2 is the need for broadband components if the two wavelengths of $\lambda_1$ and $\lambda_2$ are largely separated. In order to perform a conversion to a new wavelength and back to the original wavelength, it is possible to use a cascade of two counter-propagating design. However, as mentioned earlier this scheme will not work unless the MUX and Demuxer components, optical waveguides, etc. within the loop operate at both wavelengths. FIG. 2 shows an implementation of a counter-propagating scheme 200 in which two consecutive conversions provide back-and-forth conversion from $\lambda_1$ to $\lambda_2$ and back to $\lambda_1$. As shown in FIG. 2, in each conversion both polarization components of a dual-polarization electromagnetic wave counter-propagate within the same loop and are wavelength converted inside the same wavelength conversion component. A first loop 202 and a first wavelength conversion component(s) 204 are responsible for wavelength conversion from $\lambda_1$ to $\lambda_2$. The polarization components 206 and 208 of a dual-polarization optical signal 210 having a wavelength $\lambda_1$ are separated by a polarization de-multiplexer (e.g. polarizing beam splitter) 212 and each polarization component 206, 208 is converted to a different wavelength $\lambda_2$ by wavelength conversion component(s) 204. Polarization component 206 travels in a clockwise direction around first loop 202 and through wavelength conversion component 204, which converts polarization component 206 from wavelength $\lambda_1$ to wavelength $\lambda_2$. Similarly, polarization component 208 travels in a counter-clockwise direction around first loop 202 and through wavelength conversion component 204, which wavelength-converts polarization component 208 from wavelength $\lambda_1$ to wavelength $\lambda_2$. The wavelength-converted polarization components 214, 216 are then combined by polarization multiplexer (e.g. polarization beam splitter/combiner) 212 into a dual-polarization optical signal 218 which has a wavelength $\lambda_2$.

Second loop 220 and second wavelength conversion component 222 are responsible for wavelength conversion from $\lambda_2$ to $\lambda_1$. The polarization components 224 and 226 of a dual-polarization optical signal 218 having a wavelength $\lambda_2$ are separated by a polarization de-multiplexer (e.g. polarizing beam splitter/combiner) 228 and each polarization component 224, 226 is converted back to wavelength $\lambda_1$ by wavelength conversion component 222. Polarization component 224 travels in a clockwise direction around second loop 220 and through wavelength conversion component 222, which wavelength-converts polarization component 224 from wavelength $\lambda_2$ to wavelength $\lambda_1$. Similarly, polarization component 226 travels in a counter-clockwise direction around second loop 220 and through wavelength conversion component 222, which wavelength-converts polarization component 226 from wavelength $\lambda_2$ to wavelength $\lambda_1$. The wavelength-converted polarization components 230, 232 are then combined by polarization multiplexer (e.g. polarization beam splitter/combiner) 228 into a dual-polarization optical signal 234 which has a wavelength $\lambda_1$.

In the consecutive counter-propagating scheme shown in FIG. 2, each one of wavelength conversion component 204, 222 provides only conversion from a wavelength $\lambda_1$ to a wavelength $\lambda_2$ (wavelength conversion component 204) or conversion from a wavelength $\lambda_2$ to a wavelength $\lambda_1$ (wavelength conversion component 222) of the polarization components that pass through it, regardless of the direction in which the polarization component passes through the wavelength conversion component. As described in connection with FIG. 2, and as shown in FIG. 3, when polarization components 206, 208 pass through wavelength conversion component 204 in either a clockwise or a counter-clockwise direction after leaving polarization multiplexer/de-multiplexer (e.g. polarization beam splitter/combiner) 212, wavelength conversion component 204 converts both polarization components 206, 208 from a wavelength $\lambda_1$ to a wavelength $\lambda_2$. Likewise, when polarization components 224, 226 pass through wavelength conversion component 222 in either a clockwise or a counter-clockwise direction after leaving polarization multiplexer/de-multiplexer (e.g. polarization beam splitter/combiner) 228, wavelength conversion component 222 converts both polarization components 224, 226 from a wavelength $\lambda_2$ (e.g., 633 nm) to a wavelength $\lambda_1$ (e.g., 1560 nm). It should be noted that both the clockwise and the counterclockwise signals 206 and 208 travel inside the wavelength conversion component 204 with the same polarization and only in the opposite direction. The wavelength converting component 204 works efficiently only for one polarization component. As mentioned earlier, if a dual-polarization wavelength converting component exists with minimum or no polarization crosstalk, then signal could simply be sent through it for up- or down-conversion.

The counter-propagating scheme 200 shown in FIG. 2 provides the benefit of minimum delay since each polarization component travels within the same loop (i.e., experiences similar optical path) and is converted by the same wavelength conversion component within that loop. The counter-propagating scheme also uses only two wavelength conversion components, as compared to the four wavelength conversion components required in the polarization diversity scheme shown in FIG. 1. Thus, the counter-propagating scheme can reduce the complexity and cost of providing wavelength conversion as compared to the polarization diversity scheme.

The scheme described in FIG. 2 shows a method to perform the wavelength conversion from wavelength $\lambda_1$ to a wavelength $\lambda_2$ and conversion back to wavelength $\lambda_1$. However, to the best of the knowledge of the inventors, all of the reported research and literature using the counter propagating scheme has been done with two wavelengths $\lambda_1$ and $\lambda_2$ very closely located to each other within a narrow spectral bandwidth usually within the C-band or the L-band. Furthermore, the commercially available optical components, such as polarization beam splitters, circulators, wavelength-division multiplexers, and polarization-maintaining fibers, to name a few, usually have a limited operating band where they can easily handle both wavelengths. For a broadband application, optical components cannot handle both wavelengths, and optical fibers to operate single-mode over a wide spectrum (such as broadband photonic crystal fibers ("PCF")) are expensive and difficult to work with. Vendors currently have difficulty connecting such fibers to PPLN crystals. A brute-force solution would be to use free-space components and dichroic mirrors to resolve the issue, but this solution would add to the complexity and cost.

There is, therefore, a need for a wavelength conversion apparatus and method that overcomes one or more of the above and other deficiencies, simplifies the design, and reduces total cost and complexity.

SUMMARY OF THE INVENTION

It has now been found that the above and related objects of the present invention are obtained in the form of several related aspects, including an apparatus for wavelength conversion which extends bandwidth to other wavelength bands by wavelength conversion but does not require broadband components. The apparatus in accordance with embodiments of the present invention provides back-and-forth wavelength-conversion (i.e., both up-conversion and down-conversion) of an electromagnetic wave signal between wavelength $\lambda_1$ and wavelength $\lambda_2$ within the same wavelength-conversion loop. It is herein disclosed that some embodiments provide a single, one-way conversion in either an up or down direction without the need to return to the original wavelength.

More particularly, the present invention relates to a wavelength converter. The wavelength converter includes an input for receiving a signal having a first wavelength and a wavelength-conversion loop capable of converting the first wavelength of the signal to a second wavelength and converting the second wavelength to the first wavelength. The wavelength-conversion loop includes a first wavelength-conversion medium and a second wavelength-conversion medium.

In at least one embodiment, the wavelength-conversion loop is capable of up-converting the first wavelength to the second wavelength and down-converting the second wavelength to the first wavelength.

In at least one embodiment, the wavelength-conversion loop is capable of down-converting the first wavelength to the second wavelength and up-converting the second wavelength to the first wavelength.

In at least one embodiment, the first wavelength-conversion medium can convert the first wavelength to the second wavelength and can convert the second wavelength to the first wavelength.

In at least one embodiment, a single conversion is performed from the first wavelength to the second wavelength.

In at least one embodiment, a single conversion is performed from the second wavelength to the first wavelength.

In at least one embodiment, the first wavelength-conversion medium comprises a non-linear medium.

In at least one embodiment, the first wavelength-conversion medium comprises periodically poled lithium niobate.

In at least one embodiment, the second wavelength-conversion medium can convert the first wavelength to the second wavelength and can convert the second wavelength to the first wavelength.

In at least one embodiment, wherein the second wavelength-conversion medium comprises a non-linear medium.

In at least one embodiment, the second wavelength-conversion medium comprises periodically poled lithium niobate.

In at least one embodiment, the signal comprises a first polarization component and a second polarization component, wherein both the first polarization component and the second polarization component have the first wavelength. The first wavelength-conversion medium converts the first wavelength of the first polarization component to the second wavelength. The second wavelength-conversion medium converts the first wavelength of the second polarization component to the second wavelength.

In at least one embodiment, the waveform-conversion loop up-converts the first wavelength to the second wavelength which is spectrally apart from the first one without using broadband components.

The present invention also relates to an all-electromagnetic wavelength-division multiplexing transponder. The wavelength-division multiplexing transponder includes a first port; a second port; and a wavelength-conversion medium coupled to the first port and the second port. A first signal received at the first port and having a first wavelength is converted to a second wavelength by the wavelength-conversion medium and is provided to the second port; and a second signal received at the second port and having the second wavelength is converted to the first wavelength by the wavelength-conversion medium and is provided to the first port.

In at least one embodiment, the wavelength-conversion medium converts the first wavelength to the second wavelength based on a direction that the first signal travels through the wavelength-conversion medium, and the wavelength-conversion medium converts the second wavelength to the first wavelength based on a direction that the second signal travels through the wavelength-conversion medium.

In at least one embodiment, the wavelength-conversion medium comprises a non-linear medium.

In at least one embodiment, the wavelength-conversion medium comprises periodically poled lithium niobate.

Although specific features, capabilities, and advantages have been enumerated above, various embodiments may include some, none, or all of the enumerated features, capabilities, and advantages. These and other technical features, capabilities, and advantages of the disclosed subject matter, along with the invention itself, will be more fully understood after a review of the following figures, detailed descriptions, and claims.

BRIEF DESCRIPTION OF THE DRAWINGS

Exemplary embodiments of the present invention will be described with reference to the accompanying figures, wherein.

DETAILED DESCRIPTION OF PREFERRED EMBODIMENTS

Figure 4:
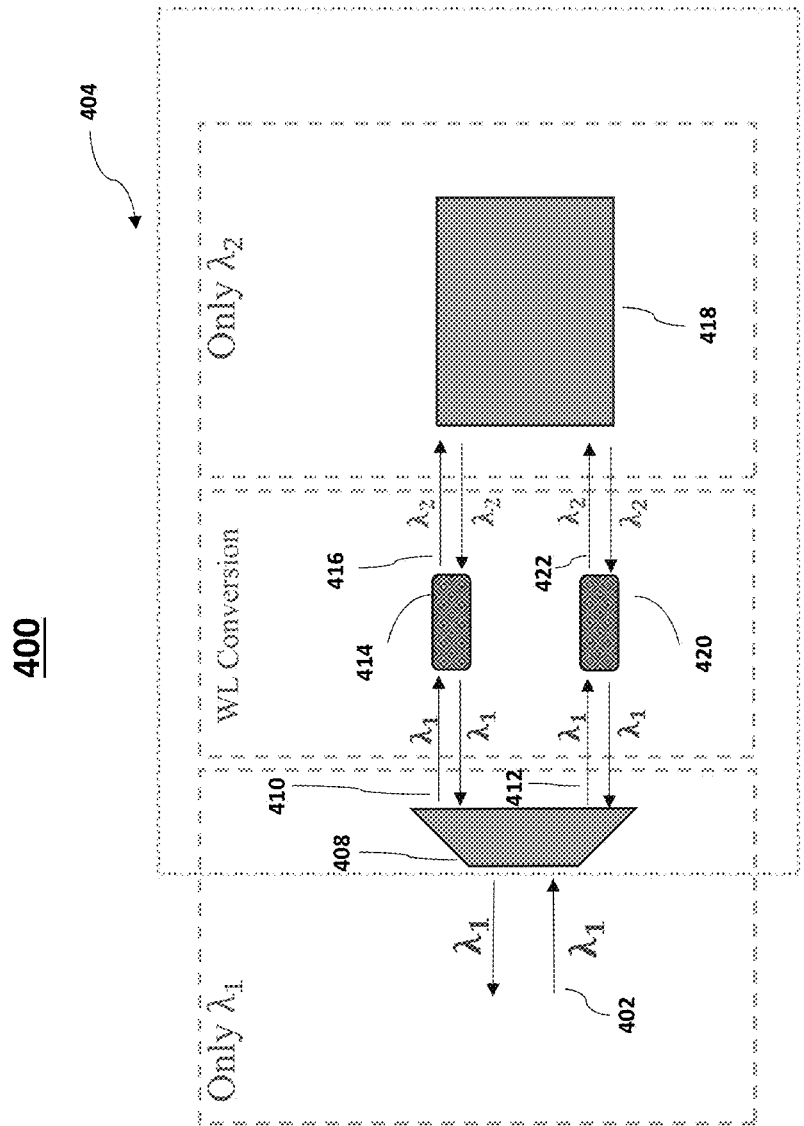
FIG. 4 shows a wavelength conversion scheme in accordance with the present invention.

FIG. 4 shows a single-loop counter-propagating wavelength conversion scheme 400 in accordance with embodiments of the present invention. Wavelength conversion is done using a wavelength converting component(s), e.g. a non-linear medium. As is well known to those skilled in the art, mixing a laser input signal and a pump laser signal in a non-linear medium translates the wavelength of the laser input signal to a different wavelength due to sum- and difference-frequency generation. As shown in FIG. 4, wavelength conversion scheme 400 uses two such wavelength converting components 414, 420, which makes it capable of converting dual-polarization signals. In preferred embodiments, one or both of wavelength converting components 414, 420 may be a periodically poled lithium niobate ("PPLN") waveguide.

An input signal 402 having a wavelength $\lambda_1$ is provided to a wavelength conversion loop 404. A polarization multiplexer/de-multiplexer (e.g. polarizing beam splitter/combiner) 408 separates the input signal 402 into a first polarization component 410 and a second polarization component 412. The first polarization component 410 travels clockwise around wavelength conversion loop 404 and is provided to wavelength conversion component (such as a PPLN) 414. Wavelength conversion component 414 converts the wavelength of the first polarization component 410 from $\lambda_1$ to $\lambda_2$ and provides a converted first polarization component 416 to a processing unit 418. Similarly, the second polarization component 412 travels counterclockwise around loop 404 and is provided to wavelength conversion component 420. Wavelength conversion component 420 converts the wavelength of the second polarization component 412 from $\lambda_1$ to $\lambda_2$ and provides a converted second polarization component 422 to processing unit 418.

The converted first and second polarization components 416, 422 are combined in processing unit 418 into a signal having a wavelength $\lambda_2$. This signal is then available to be extracted from processing unit 418 for use outside of wavelength conversion loop 404.

Wavelength conversion loop 404 can also be used to convert a signal having a wavelength $\lambda_2$ from wavelength $\lambda_2$ back to wavelength $\lambda_1$, the wavelength of input signal 402. The processing unit 418 separates the signal back into converted first and second polarization components 416, 422. The processing unit provides the converted first polarization component 416 to wavelength conversion component 420, which converts the wavelength of converted first polarization component 416 from $\lambda_2$ back to $\lambda_1$, thereby restoring the original first polarization component 410 traveling in the clockwise direction from wavelength conversion component 420 to polarization multiplexer/de-multiplexer (e.g., polarizing beam splitter/combiner) 408. Similarly, converted second polarization component 422 is then provided to wavelength converting component 414, which converts the wavelength of converted second polarization component 422 from $\lambda_2$ back to $\lambda_1$, thereby restoring the original second polarization component 412 traveling in the counter-clockwise direction. Both first and second polarization components 410, 412 then complete their respective trips around wavelength conversion loop 404 and are recombined in polarization multiplexer/de-multiplexer (e.g., polarizing beam splitter/combiner) 408 to restore the original input signal 402, with its wavelength $\lambda_1$.

Figure 1:
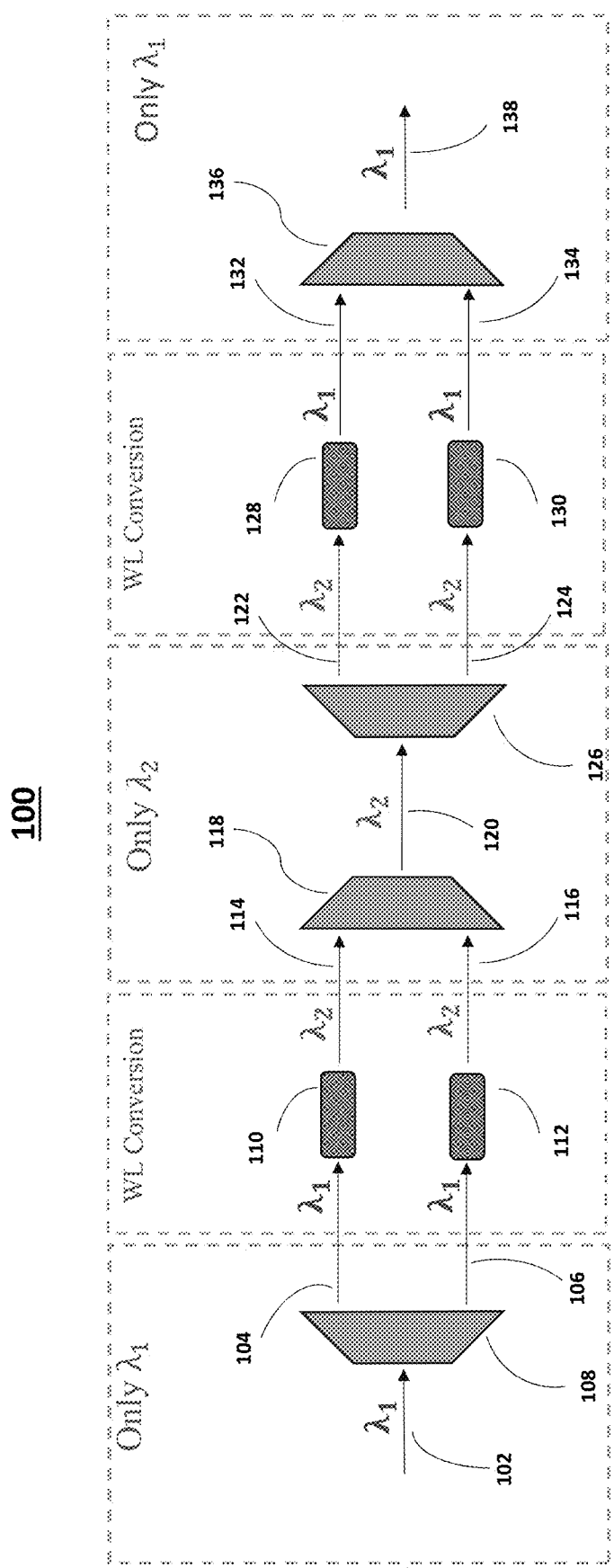
FIG. 1 shows a conventional wavelength conversion scheme.
Figure 2:
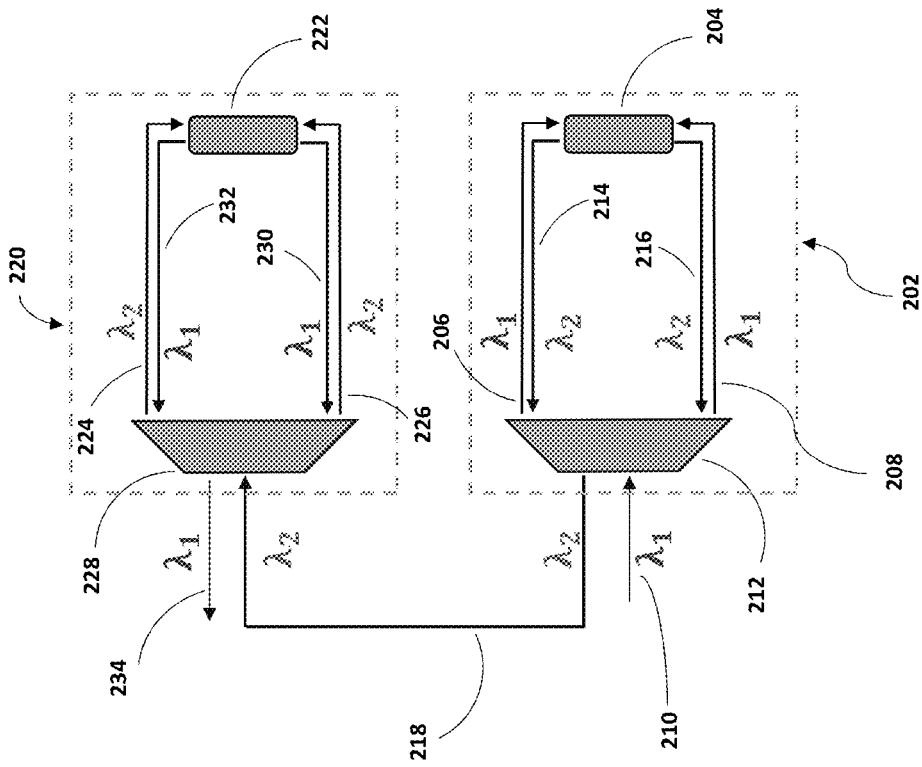
FIG. 2 shows another conventional wavelength conversion scheme.
Figure 3:
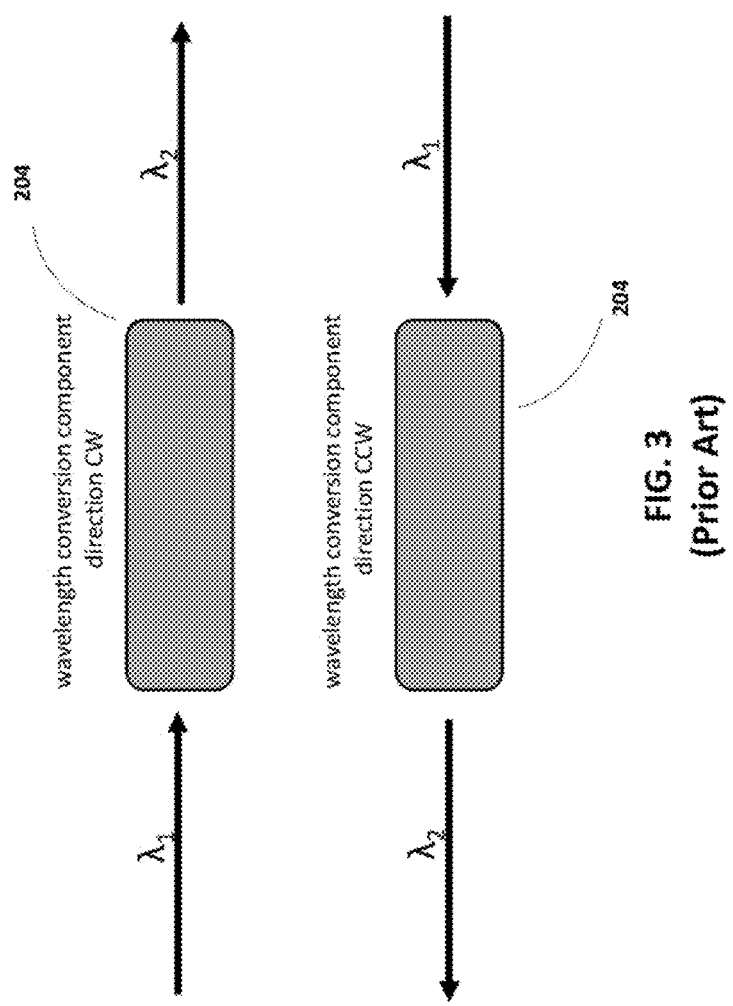
FIG. 3 illustrates an aspect of the operation of the conventional wavelength conversion scheme shown in FIG. 2.
Figure 5:
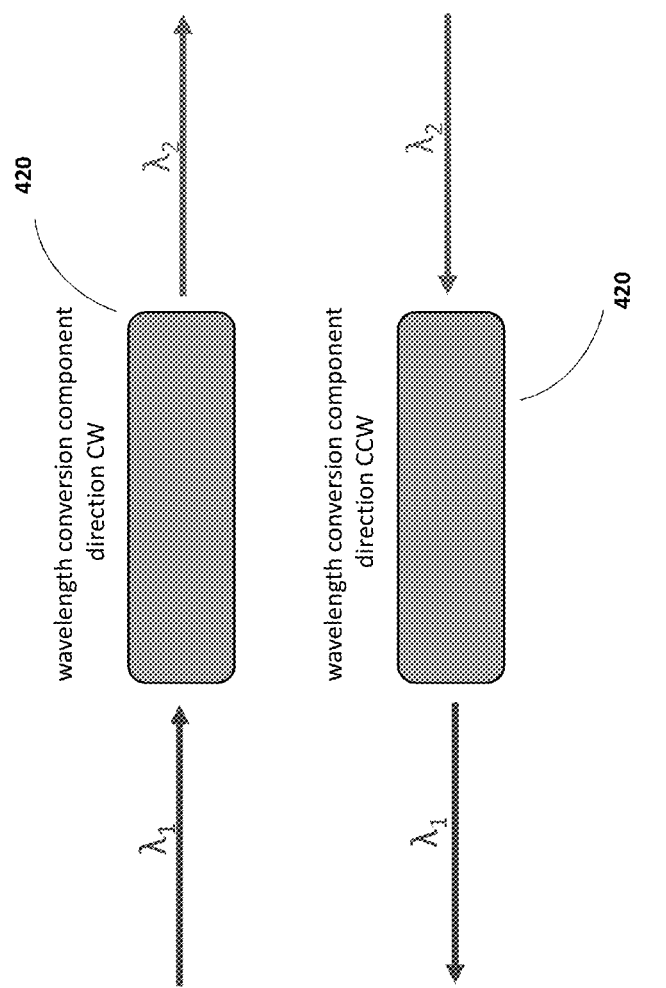
FIG. 5 illustrates an aspect of the wavelength conversion scheme shown in FIG. 4.

Unlike the conventional, consecutive counter-propagating scheme shown in FIG. 2, in the single-loop scheme shown in FIG. 4, each one of wavelength conversion components 414, 420 provides both up-conversion and down-conversion of the polarization components that pass through it, depending upon the direction in which the polarization component passes through the wavelength conversion component. As described in connection with FIG. 4, and as shown in FIG. 5, when converted first polarization component 416 passes through wavelength conversion component 420 in a clockwise direction after leaving the processing unit 418, wavelength conversion component 420 wavelength-converts first polarization component 416 from a wavelength $\lambda_2$ to a wavelength $\lambda_1$. In contrast, when second polarization component 412 passes through wavelength conversion component 420 in a counter-clockwise direction after leaving polarization multiplexer/de-multiplexer (e.g., polarization beam splitter/combiner) 408, wavelength conversion component 420 wavelength-converts second polarization component 412 from a wavelength $\lambda_1$ to a wavelength $\lambda_2$.

Similarly, when first polarization component 410 passes through wavelength conversion component 414 in a clockwise direction after leaving polarization multiplexer/de-multiplexer 408, wavelength conversion component 414 wavelength-converts first polarization component 410 from a wavelength $\lambda_1$ to a wavelength $\lambda_2$. In contrast, when converted second polarization component 422 passes through wavelength conversion component 414 in a counter-clockwise direction after leaving the processing unit 418, wavelength conversion component 414 wavelength-converts second polarization component 422 from a wavelength $\lambda_2$ (e.g., 1560 nm) to a wavelength $\lambda_1$ (e.g., 633 nm).

Figure 6:
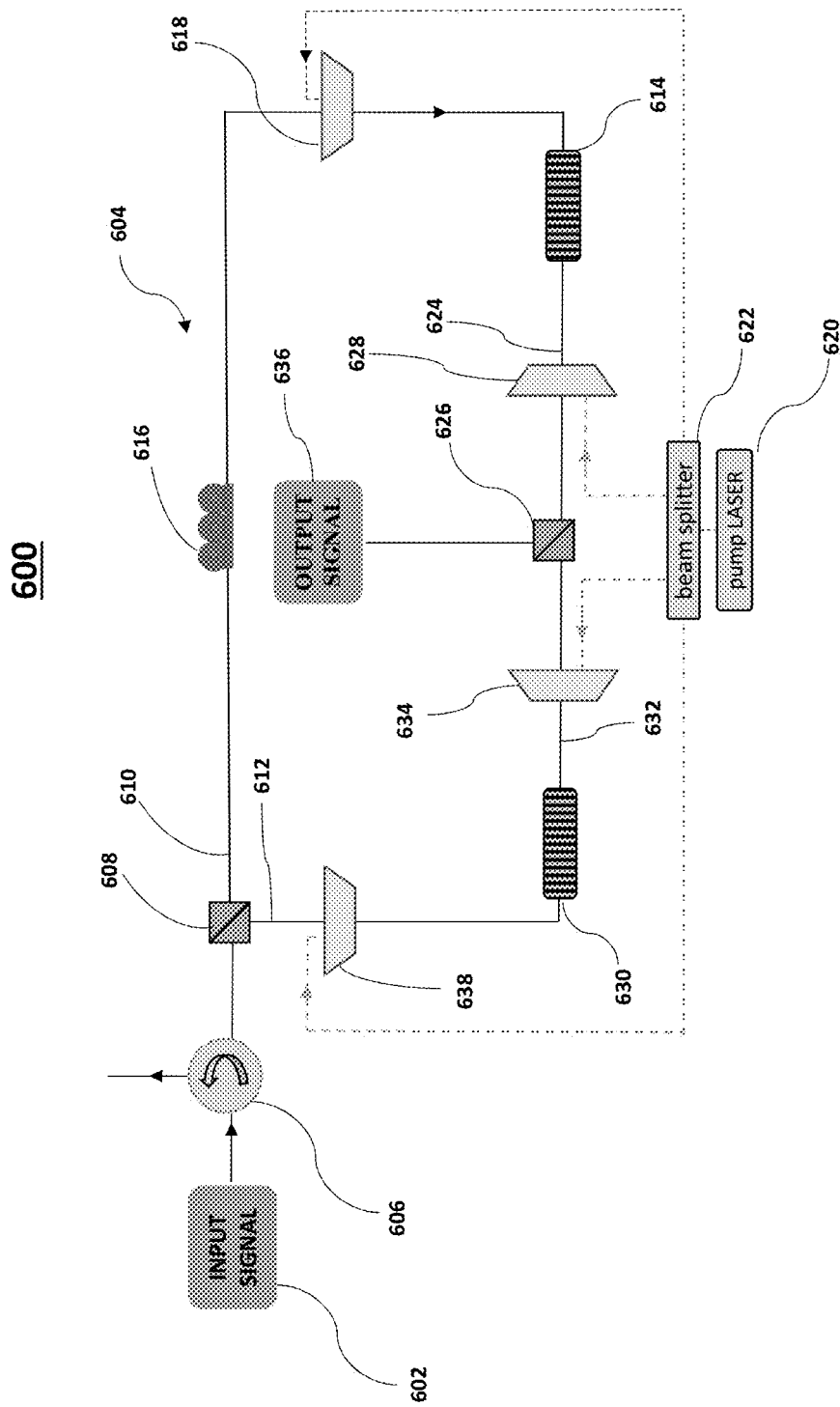
FIG. 6 shows a schematic diagram of an embodiment of a wavelength conversion scheme in accordance with the present invention.

FIG. 6 shows a single-loop counter-propagating wavelength conversion scheme 600 for conversion of an optical input signal in accordance with embodiments of the present invention. An optical input signal 602 having a wavelength $\lambda_1$ is provided to a wavelength conversion loop 604 through a circulator 606. A polarization multiplexer/demultiplexer 608 separates the input signal 602 into a first polarization component 610 and a second polarization component 612. The first polarization component 610 travels clockwise around wavelength conversion loop 604 and is provided to wavelength conversion component 614 through an optional polarization controller 616 and a wavelength multiplexer (e.g. WDM, dichroic mirror) 618. Polarization controller 616 can be used to eliminate possible crosstalk between the first and second polarization components 610, 612. The wavelength conversion in wavelength conversion component 614 is based on the sum- and difference-frequency generation in wavelength conversion component (e.g. a nonlinear crystal) 614 using a pump LASER (if needed) 620. The pump LASER 620 is provided to wavelength conversion component 614 through a beam splitter 622 and wavelength-multiplexer 618. Wavelength conversion component 614 converts the wavelength of the first polarization component 610 from $\lambda_1$ to $\lambda_2$ and provides a converted first polarization component 624 to a polarization multiplexer/de-multiplexer 626 through wavelength multiplexer/de-multiplexer 628.

Similarly, the second polarization component 612 travels counter-clockwise around loop 604 and is provided to wavelength conversion component 630 through a wavelength-multiplexer/demultiplexer 638. The wavelength conversion in wavelength conversion component 630 is based on the sum- and difference-frequency generation in wavelength conversion component 630 using pump laser 620, which is provided to wavelength conversion component 630 through abeam splitter 622 and wavelength-multiplexer/de-multiplexer 638. Wavelength conversion component 630 converts the wavelength of the second polarization component 612 from $\lambda_1$ to $\lambda_2$ and provides a converted second polarization component 632 to polarization multiplexer/de-multiplexer 626 through multiplexer/de-multiplexer 634.

The converted first and second polarization components 624, 632 are combined in polarization multiplexer/de-multiplexer 626 into an output signal 636 having a wavelength $\lambda_2$.

Wavelength converted signal 636 is then available to be extracted from polarization multiplexer/de-multiplexer 626 for use outside of wavelength conversion loop 604. In an exemplary embodiment, the output signal 636 can be propagated in free space before being returned to wavelength conversion loop 604. In another exemplary embodiment, the output signal can be provided to an angle multiplexing system. Systems and methods of angle multiplexing are described in U.S. Pat. No. 10,789,009 which is assigned to the assignee of the present application and is incorporated by reference herein in its entirety.

Wavelength conversion loop 604 can also be used to convert output signal 636 from wavelength $\lambda_2$ back to wavelength the wavelength of input signal 602. When the wavelength-converted signal is returned to polarization multiplexer/de-multiplexer 626, polarization multiplexer/de-multiplexer 626 separates it back into converted first and second polarization components 624, 632. Converted first polarization component 624 is then provided to wavelength conversion component 630 through wavelength multiplexer/de-multiplexer 634, which converts the wavelength of converted first polarization component 624 from $\lambda_2$ back to $\lambda_1$, thereby restoring original first polarization component 610. This wavelength conversion in wavelength conversion component 630 could be based on the sum- and difference-frequency generation in a nonlinear crystal such as a PPLN crystal 630 using pump laser 620, which is provided to wavelength conversion component 630 through a beam splitter 622 and wavelength conversion component 634.

Similarly, converted second polarization component 632 is then provided to wavelength conversion component 614 through wavelength-division multiplexer 628, which converts the wavelength of converted second polarization component 632 from $\lambda_2$ back to $\lambda_1$, thereby restoring original second polarization component 612. This wavelength conversion in wavelength conversion component 614 could be based on the sum- and difference-frequency generation in nonlinear crystal such as a PPLN crystal 614 using pump laser 620, which is provided to wavelength conversion component 614 through a beam splitter 622 and wavelength-division multiplexer 628.

Both first and second polarization components 610, 612 then complete their respective trips around wavelength conversion loop 604 and are re-combined in polarization multiplexer/de-multiplexer 608 to restore the original input signal 602, with its wavelength $\lambda_1$. The input signal 602 is then returned to circulator 606, from which it is available to be extracted.

Figure 6A:
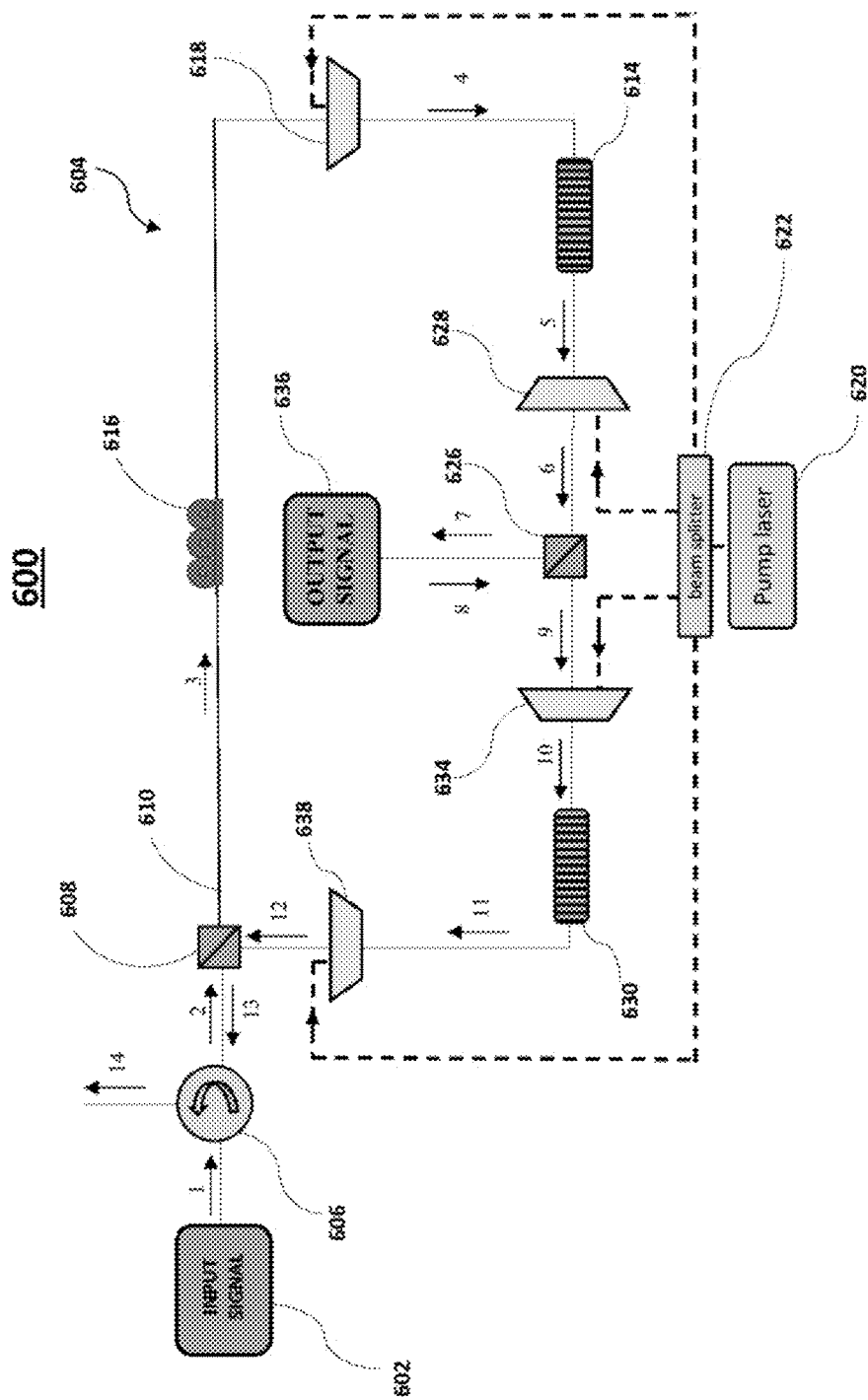
FIG. 6A illustrates an aspect of the wavelength conversion scheme shown in FIG. 6.

To aid in understanding the operation of wavelength conversion loop 604, FIG. 6A shows the circulation of first polarization component 610 in a clockwise direction around wavelength conversion loop 604 using numbered arrows 1-14. Numbered arrows 1-4 and 11-14 indicate the portions of wavelength conversion loop 604 where first polarization component 610 has a wavelength Numbered arrows 5-10 indicate the portions of wavelength conversion loop 604 where first polarization component 610 has a wavelength $\lambda_2$. As shown in FIG. 6A, these portions are the "inside" portions of wavelength conversion loop 604 (i.e., between wavelength conversion components 614, 630).

It should be understood that reversing the directions of numbered arrows 3-12 in FIG. 6A would show the circulation of second polarization component 612 in a counter-clockwise clockwise direction around wavelength conversion loop 604. Numbered arrows 1-4 and 11-14 would indicate the portions of wavelength conversion loop 604 where second polarization component 612 has a wavelength $\lambda_1$. Numbered arrows 5-10 would indicate the portions of wavelength conversion loop 604 where second polarization component 612 has a wavelength $\lambda_2$.

Wavelength conversion scheme 600 can be implemented in free space or using optical waveguides, and optical fibers, including as appropriate single-mode fibers, multimode fibers, and polarization-maintaining fibers. The wavelength conversion scheme 600 can be implemented based on commercially available optical components.

In accordance with an embodiment of the present invention, the optical input signal 602 can have a wavelength $\lambda_1$ that is in the C band. In accordance with another embodiment of the present invention, the output signal 636 at polarization beam splitter 626 can have a different wavelength $\lambda_2$ that is also in the C band. In accordance with yet another embodiment of the present invention, the optical input signal 602 can have a wavelength $\lambda_1$ of 1560 nm. In accordance with still another embodiment of the present invention, the output signal 636 at polarization beam splitter 626 can have a wavelength $\lambda_2$ of ~631 nm (satisfying the energy conservations). In accordance with another embodiment of the present invention, the pump laser 620 can have a wavelength of 1060 nm. Given the right selection of pump laser (if needed) and wavelength conversion component it is possible to generate a broad spectral range at the second wavelength $\lambda_2$ independent of the first wavelength $\lambda_1$. None of the components are required to work at both $\lambda_1$ and $\lambda_2$. In accordance with yet another embodiment of the present invention, the output signal 636 provided at polarization beam splitter 626 can be at a very broad wavelength range even though wavelength conversion scheme 600 is implemented without using broadband components.

In accordance with yet another embodiment of the present invention, the wavelength conversion scheme 600 shown in FIG. 6 can be used to provide a single, one-way conversion in either an up or down direction without the need to return to the original wavelength. For example, in a communication system, in order to avoid wavelength collision or contention, a wavelength can be converted to another wavelength and continue propagating in the communication system without the need to reconvert back to the original wavelength. In accordance with still another embodiment of the present invention, the first and second wavelength conversion components 614, 630 of wavelength conversion scheme 600 are capable of converting the first wavelength to the second wavelength and are capable of converting the second wavelength to a third wavelength (which could be the first wavelength).

Figure 6B:
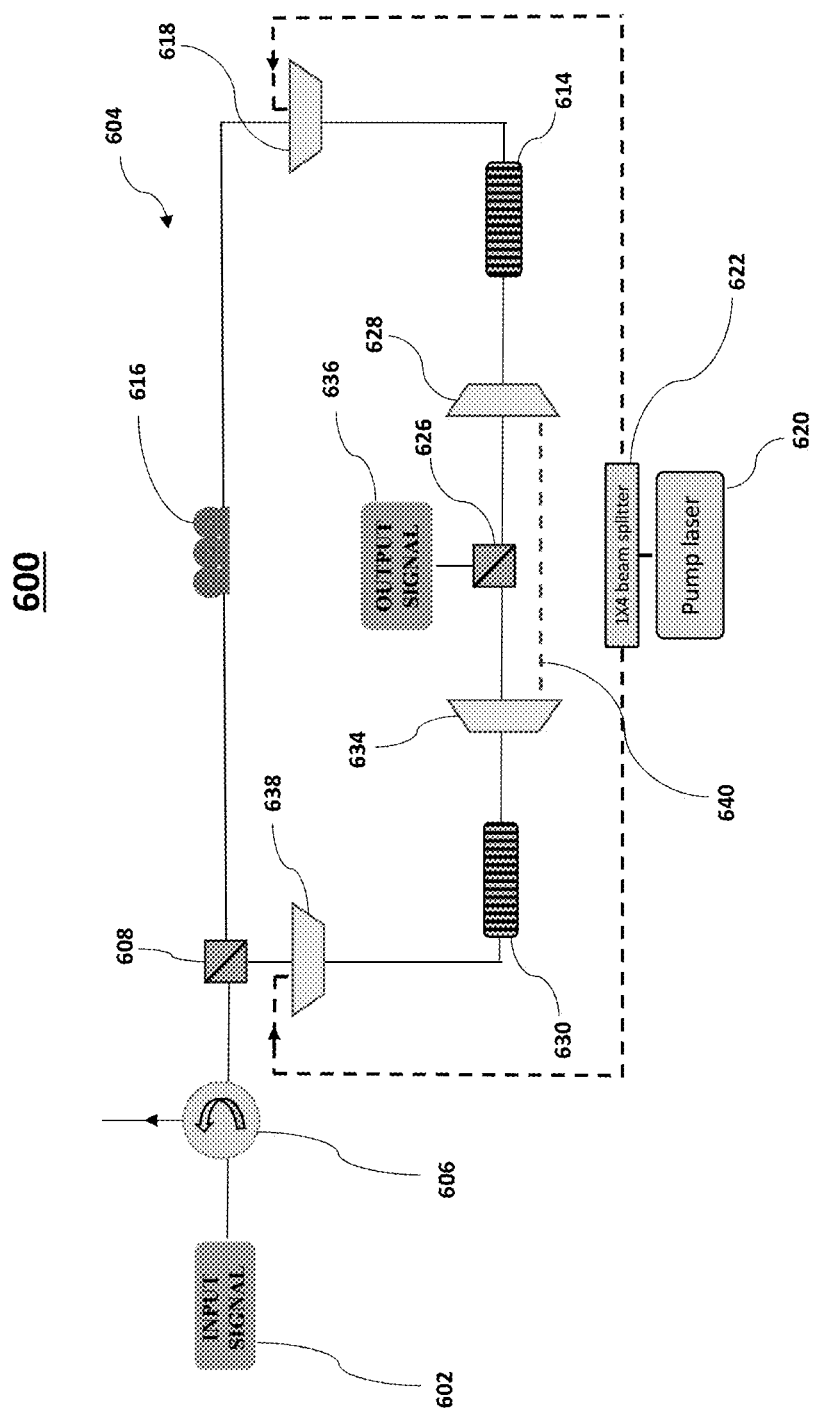
FIG. 6B shows a modification of the embodiment of the wavelength conversion scheme shown in FIG. 6.

A well-known method to perform wavelength conversion is to use a nonlinear process. In this case, usually, a pump laser is needed, and the wavelength conversion medium could be a nonlinear crystal and any form of a nonlinear medium. In some of the non-linear process, the pump laser 620 is undepleted. In view of this fact, in accordance with another embodiment in accordance with the present invention, the wavelength conversion scheme 600 can employ a pump recycling which recirculates residual pump power from one nonlinear conversion medium to be used in another one (or in the same wavelength conversion component). As shown in FIG. 6B, in the wavelength conversion scheme 600, pump recycling can be implemented by connecting wavelength-division multiplexers 628, 634 to one another via connection 640. In alternative embodiments, pump recycling can be implemented using a highly reflective coating inside each wavelength conversion component 628, 634.

Figure 7:
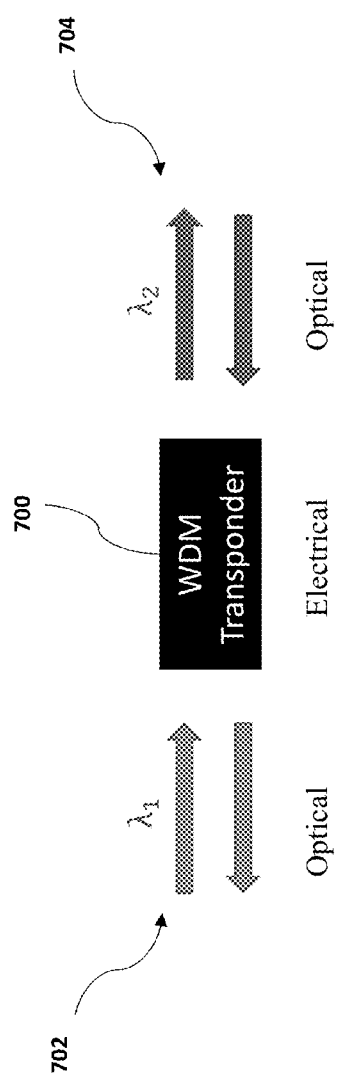
FIG. 7 illustrates the operation of a conventional wavelength-division multiplexing transponder.

The wavelength conversion schemes described herein have broad applicability, such as, for example, wavelength-converting transmitter/receivers, broadband constellation transparent detectors, ROADM (reconfigurable optical add/drop multiplexers), and optical wavelength-division multiplexing transponders. An optical wavelength-division multiplexing transponder is a wavelength converter that converts a received signal after receiving it and transmits the same signal in another wavelength. Such devices work for both wavelengths. The operation of a conventional optical-electronic-optical (OEO) WDM transponder 700 is shown in FIG. 7. The WDM transponder 700 receives an optical signal 702 having a wavelength $\lambda_1$ and electrically converts it to an optical signal 704 having a wavelength $\lambda_2$. The WDM transponder 700 then transmits the optical signal 704. Similarly, the WDM transponder 700 can receive the optical signal 704 having a wavelength $\lambda_2$ and electrically convert it to the optical signal 702 having a wavelength $\lambda_1$ before transmitting the optical signal 702. The main disadvantage of OEO WDM transponder 700 is the optical-to-electrical and electrical-to-optical conversions that are required. An all-optical WDM transponder would achieve the same results without the disadvantageous optical-to-electrical and electrical-to-optical conversions required by OEO WDM transponder 700.

Figure 8:
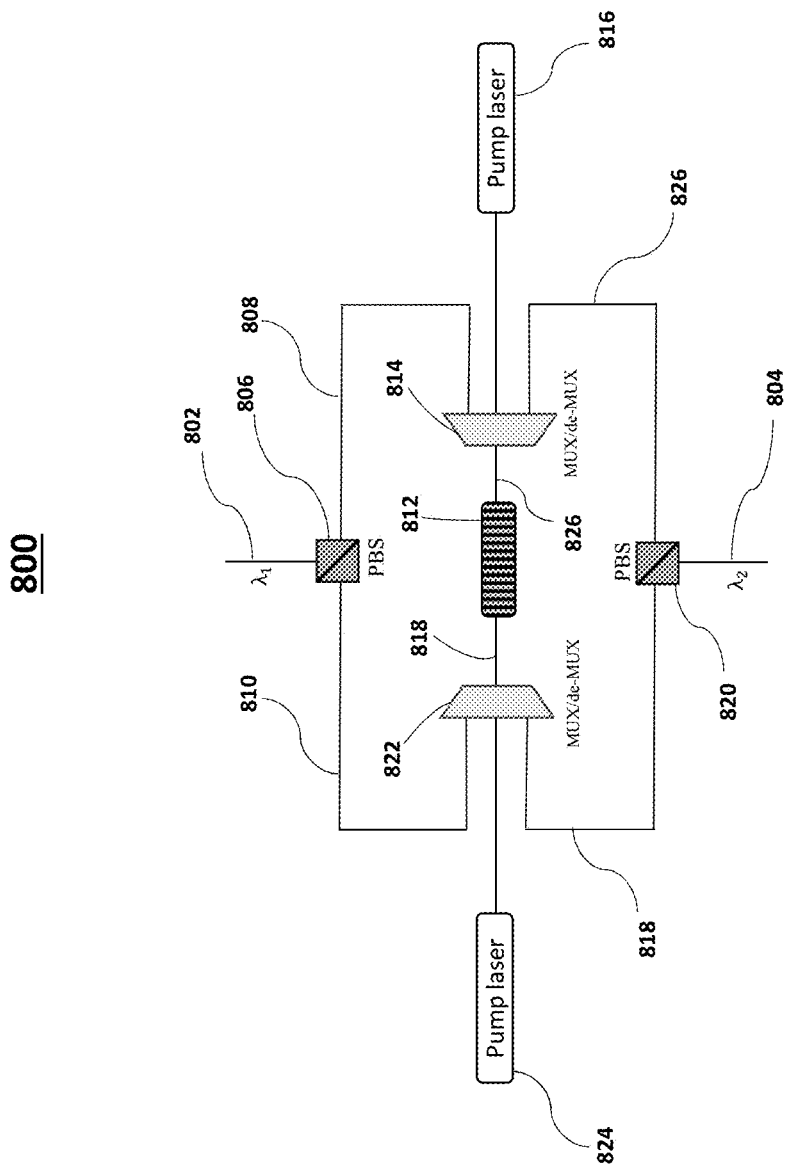
FIG. 8 shows a schematic diagram of an embodiment of a wavelength-division multiplexing transponder in accordance with the present invention.

In another embodiment in accordance with the present invention, an all-optical WDM transponder is provided. FIG. 8 shows an all-optical WDM transponder 800 which can operate at any given wavelength. An input signal 802 having a wavelength $\lambda_1$ is provided at the first port of the WDM transponder 800 and will be converted to the new wavelength $\lambda_2$ at a second port of the WDM transponder 800.

An input signal 802 having a wavelength $\lambda_1$ is provided to a polarization beam splitter 806, which separates the input signal 802 into a first polarization component 808 and a second polarization component 810. The first polarization component 808 is provided to wavelength converting component 812 through wavelength-division multiplexer 814. Pump laser 816 is also provided to wavelength converting component 812 through wavelength-division multiplexer 814. Wavelength converting component 812 converts the wavelength of the first polarization component 808 from $\lambda_1$ to $\lambda_2$ and provides a converted first polarization component 818 to a polarization beam splitter 820 through wavelength-division multiplexer 822.

Similarly, the second polarization component 810 is provided to wavelength converting component 812 through wavelength-division multiplexer 822. Pump laser 824 is also provided to wavelength converting component 812 through wavelength-division multiplexer 822. Wavelength converting component 812 converts the wavelength of the second polarization component 810 from $\lambda_1$ to $\lambda_2$ and provides a converted second polarization component 826 to polarization beam splitter 820 through wavelength-division multiplexer 814. The converted first and second polarization components 808, 810818, 826 are combined in polarization beam splitter 820 into an output signal 804 having a wavelength $\lambda_2$. Output signal 804 is then available for transmission.

Figure 8A:
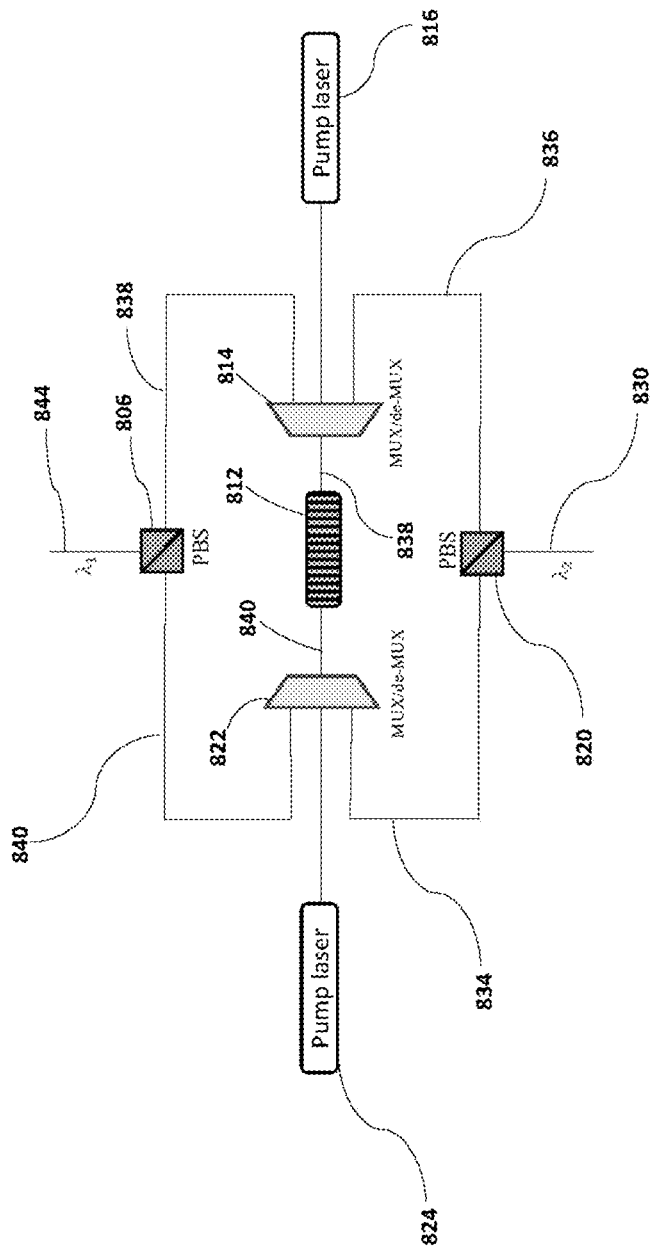
FIG. 8A illustrates an aspect of the operation of the wavelength-division multiplexing transponder shown in FIG. 8.

The operation of WDM transponder 800 when an input signal having a wavelength $\lambda_2$ is provided at the second port of the WDM transponder 800 and is converted to the new wavelength $\lambda_1$ at the first port of the WDM transponder 800 will now be described. Referring to FIG. 8A, an input signal 830 having a wavelength $\lambda_2$ is provided to the polarization beam splitter 820, which separates the input signal 830 into a first polarization component 834 and a second polarization component 836. The first polarization component 834 is provided to wavelength converting component 812 through wavelength-division multiplexer 822. Pump laser 824 is also provided (if required) to wavelength converting component 812 through wavelength-division multiplexer 822. Wavelength converting component 812 converts the wavelength of the first polarization component 834 from $\lambda_2$ to $\lambda_1$ and provides a converted first polarization component 838 to polarization beam splitter 806 through wavelength-division multiplexer 814.

Similarly, the second polarization component 836 is provided to wavelength converting component 812 through wavelength-division multiplexer 814. Pump laser 816 is also provided (if required) to wavelength converting component 812 through wavelength-division multiplexer 814. Wavelength converting component 812 converts the wavelength of the second polarization component 836 from $\lambda_2$ to $\lambda_1$ and provides a converted second polarization component 840 to polarization beam splitter 806 through wavelength-division multiplexer 822. The converted first and second polarization components 834, 836 are combined in polarization beam splitter 806 into an output signal 844 having a wavelength $\lambda_1$. Output signal 844 is then available for transmission.

As described above, a signal having a wavelength $\lambda_2$ coming from the second port of WDM transponder 800 will be converted to wavelength $\lambda_1$ in the first port of WDM transponder 800. Thus, WDM transponder 800 works for both wavelengths as the input wavelength. If the input wavelength is $\lambda_1$, then the output wavelength will be $\lambda_2$ and vice versa. WDM transponder 800 is format transparent (i.e., it does not matter what signal constellation (phase encoding) the input signals use), can work for both single and double-polarization signals, and can be implemented easily for a broadband application. One main advantage of WDM transponder 800 is its almost instantaneous response time, which makes it suitable for very high bit rate wavelength conversion applications.

Figure 9:
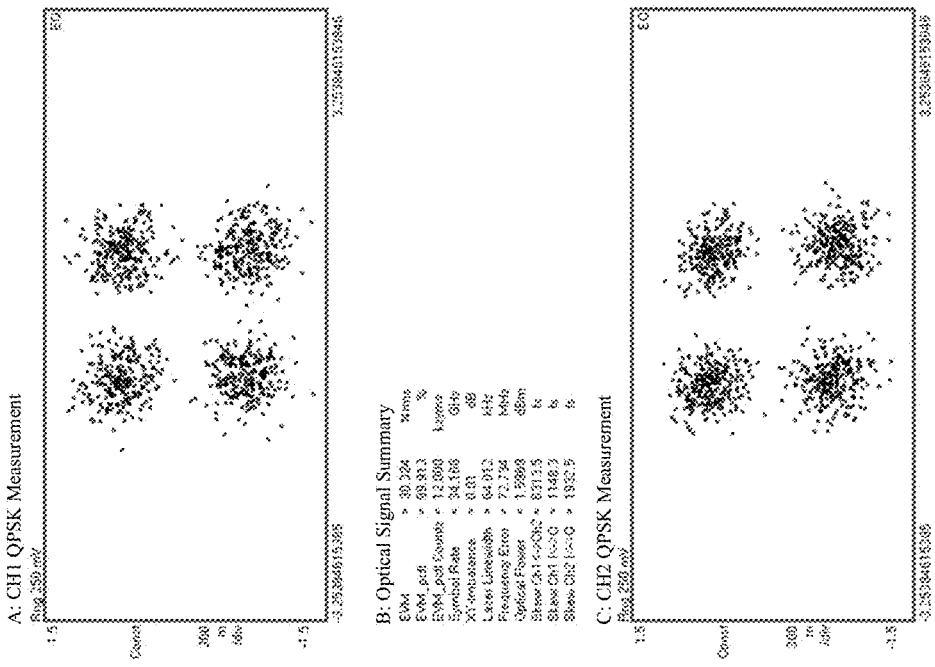
FIG. 9 shows output signals provided by the embodiment of the wavelength conversion scheme shown in FIG. 6.

FIG. 9 shows the experimental demonstration of the constellation pattern provided by wavelength conversion scheme 600 of FIG. 6 for the consecutive up- and down-conversion of dual-polarization QPSK data. The 1560 nm dual-polarization QPSK data was up-converted to a wavelength of 633 nm and consecutively down-converted back to the wavelength of 1560 nm. No delay compensation or any amplitude balancing between the two polarizations of the QPSK data was needed.

The novel and inventive wavelength conversion scheme in accordance with embodiments of the present invention provide several benefits and advantages. The wavelength conversion scheme has a broadband application although it does not require broadband components. It works from continuous-wave to high bit-rate signals since it has an almost instantaneous response time. The wavelength conversion scheme is phase-insensitive, which makes it suitable for phase-encoded signals. In other words, any input signal (regardless of its properties such as polarization, phase, temporal shape, and bitrate) will be converted to another wavelength at the output while preserving the properties of the input signal enabling using more of the spectrum where commercial hardware is not available.

Since both wavelength conversions are performed in the same loop, the wavelength conversion scheme provides high environmental stability (e.g., reduces the effect of temperature fluctuations) and it reduces the effects of amplitude noise (i.e., distortion) of the converted signal. Since both polarization components travel only in different directions within the same loop, polarization mode dispersion (PMD) is minimized and there is no need to add a delay-line to compensate for PMD. Also, the counter-propagating scheme in the same loop automatically results in a balanced wavelength conversion for both polarizations and reduces the bit error rate penalty due to an imbalance between the two orthogonal polarizations. This resolves the need to balance the two polarizations' amplitudes using a polarization-dependent optical attenuator.

The wavelength conversion scheme in accordance with the present invention reduces complexity and cost. The single-loop counter-propagating wavelength conversion scheme in accordance with embodiments of the present invention is less complex than a comparable conventional polarization diversity wavelength conversion scheme and is less costly as it only uses two wavelength conversion devices (e.g., PPLNs, nonlinear crystal, nonlinear fibers, etc.) for wavelength conversion. A WDM transponder in accordance with embodiments of the present invention uses only one wavelength conversion device (e.g., a PPLN).

The single-loop counter-propagating wavelength conversion scheme in accordance with embodiments of the present invention also enables the implementation of all-optical wavelength conversion and an all-optical WDM transponder.

Finally, due to residual pump recycling in optical embodiments in accordance with the present invention, residual pump laser power from one wavelength conversion device can be used in another wavelength conversion device (or in the same wavelength conversion device), thereby reducing laser pump power consumption considerably and thus increasing total power efficiency.

While this invention has been described in conjunction with exemplary embodiments outlined above and illustrated in the drawings, it is evident that the principles of the present invention may be implemented using any number of techniques, whether currently known or not, and many alternatives, modifications, and variations in form and detail will be apparent to those skilled in the art. Modifications, additions, or omissions may be made to the systems, apparatuses, and methods described herein without departing from the scope of the present invention. For example, the components of the systems and apparatuses may be integrated or separated. Also, the system may be implemented in free space, in a waveguide, in optical fiber(s), or a combination of these. Furthermore, the operations of the systems and apparatuses disclosed herein may be performed by more, fewer, or other components, and the methods described may include more, fewer, or other steps. Additionally, steps may be performed in any suitable order. While the dual-polarization has been used as an example and shown experimentally for this design, however other attributes may be considered such as spatial modes, etc. It should be mentioned that it has been shown experimentally that more than one input signal could be sent to the system for wavelength conversion from $\lambda_1$ to $\lambda_2$ and back to $\lambda_1$.

In addition, although embodiments in accordance with the present invention have been shown and described with regard to optical signals, it should be understood that the principles of the present invention are not limited to wavelength conversion involving optical signals but encompass as well embodiments that implement wavelength conversion of electromagnetic wave signals generally. Information or any kind of data can be stored as electromagnetic waves (e.g., generated by LASER, optical beam, radio frequency (RF) signals, other types of electromagnetic wave signals, to name a few), which can be transmitted and/or reflected between structures or within structures in various transmission media (e.g., free space, vacuum, crystals, nonlinear media, optical waveguides, optical fibers, to name a few). The terms "electromagnetic wave signal" and "electromagnetic wave beam" are used herein interchangeably. Electromagnetic radiation or electromagnetic beam as used herein may include any kind of electromagnetic signal, including a LASER beam or signal, a MASER beam or signal, an optical beam or signal, or any type of wired or wireless signal, including acoustic waves, radio waves, IR radiation, UV radiation, microwave-band transmission, or any combination of more than one of the foregoing. While referred to herein sometimes simply as a LASER beam or signal, other types of optical signals and other types of electromagnetic radiation transmissions, including radio waves, microwaves, IR, UV, and combinations of bandwidths of wavelengths of electromagnetic radiation, whether guided, shaped, phased, or none of the foregoing, are also intended to be included.

Accordingly, the exemplary embodiments of the invention, as set forth above, are intended to be illustrative, not limiting, and the spirit and scope of the present invention are to be construed broadly and limited only by the appended claims and not by the foregoing specification.

In addition, unless otherwise specifically noted, the articles depicted in the drawings are not necessarily drawn to scale.

What is claimed is:

1. A wavelength converter, comprising:
   an input for receiving a signal having a first wavelength; and
   a single wavelength-conversion loop capable of converting the first wavelength of the signal to a second wavelength and converting the second wavelength to the first wavelength, the wavelength-conversion loop comprising a first wavelength-conversion medium coupled to an input of the wavelength-conversion loop and to an output of the wavelength-conversion loop and a second wavelength-conversion medium coupled to the input of the wavelength-conversion loop and to the output of the wavelength-conversion loop.

2. The wavelength converter of claim 1, wherein the wavelength-conversion loop is capable of up-converting the first wavelength to the second wavelength and down-converting the second wavelength to the first wavelength.

3. The wavelength converter of claim 1, wherein the wavelength-conversion loop is capable of down-converting the first wavelength to the second wavelength and up-converting the second wavelength to the first wavelength.

4. The wavelength converter of claim 1, wherein a single conversion is performed from the first wavelength to the second wavelength.

5. The wavelength converter of claim 1, wherein a single conversion is performed from the second wavelength to the first wavelength.

6. The wavelength converter of claim 1, wherein the first wavelength-conversion medium is capable of converting the first wavelength to the second wavelength and converting the second wavelength to the first wavelength.

7. The wavelength converter of claim 6, wherein the first wavelength-conversion medium comprises a non-linear medium.

8. The wavelength converter of claim 7, wherein the first wavelength-conversion medium comprises periodically poled lithium niobate.

9. The wavelength converter of claim 6, wherein:
   the first wavelength-conversion medium converts the first wavelength to the second wavelength or converts the second wavelength to the first wavelength depending on a direction in which the signal travels through the first wavelength-conversion medium.

10. The wavelength converter of claim 1, wherein the second wavelength-conversion medium is capable of converting the first wavelength to the second wavelength and converting the second wavelength to the first wavelength.

11. The wavelength converter of claim 10, wherein the second wavelength-conversion medium comprises a non-linear medium.

12. The wavelength converter of claim 11, wherein the second wavelength-conversion medium comprises periodically poled lithium niobate.

13. The wavelength converter of claim 10, wherein:
   the second wavelength-conversion medium converts the first wavelength to the second wavelength or converts the second wavelength to the first wavelength depending on a direction in which the signal travels through the second wavelength-conversion medium.

14. The wavelength converter of claim 1, wherein:
the signal comprises a first polarization component and a second polarization component, wherein both the first polarization component and the second polarization component have the first wavelength;
the first wavelength-conversion medium converts the first wavelength of the first polarization component to the second wavelength; and
the second wavelength-conversion medium converts the first wavelength of the second polarization component to the second wavelength.

15. The wavelength converter of claim 1, wherein the first wavelength-conversion medium is capable of converting the first wavelength to the second wavelength and is capable of converting the second wavelength to a third wavelength.

16. The wavelength converter of claim 1, wherein the second wavelength-conversion medium is capable of converting the first wavelength to the second wavelength and is capable of converting the second wavelength to a third wavelength.

17. The wavelength converter of claim 1, wherein the wavelength-conversion loop comprises:
a first portion where the signal has the first wavelength; and
a second portion where the signal has the second wavelength;
wherein the first portion and the second portion are separated by the first wavelength-conversion medium and the second wavelength-conversion medium.

18. The wavelength converter of claim 1, wherein:
the first portion of the wavelength-conversion loop is between the first wavelength-conversion medium and the second wavelength-conversion medium and is coupled to the input of the wavelength-conversion loop; and
the second portion of the wavelength-conversion loop is between the first wavelength-conversion medium and the second wavelength-conversion medium and is coupled to the output of the wavelength-conversion loop.

19. The wavelength converter of claim 1, wherein:
the signal having the first wavelength has a first polarization component and a second polarization component;
one of the first and second polarization components travels in a clockwise direction within the wavelength-conversion loop; and
the other one of the first and second polarization components travels in a counter-clockwise direction within the wavelength-conversion loop;
wherein the first and second polarization components travel within the same optical path.

20. The wavelength converter of claim 1, wherein:
the signal having the second wavelength has a first polarization component and a second polarization component;
one of the first and second polarization components travels in a clockwise direction within the wavelength-conversion loop; and
the other one of the first and second polarization components travels in a counter-clockwise direction within the wavelength-conversion loop;
wherein the first and second polarization components travel within the same optical path.

21. A wavelength converter, comprising:
an input for receiving a signal having a first wavelength; and
a wavelength-conversion loop capable of converting the first wavelength of the signal to a second wavelength and converting the second wavelength to the first wavelength, the first wavelength and the second wavelength separated from each other by a broad spectral range, the wavelength-conversion loop comprising a first wavelength-conversion medium and a second wavelength-conversion medium;
wherein the wavelength-conversion loop is capable of up-converting the first wavelength to the second wavelength and down-converting the second wavelength to the first wavelength without using broadband components.

22. A wavelength-division multiplexing transponder, comprising:
a single wavelength-conversion loop having a first port and a second port; and
a first wavelength-conversion medium coupled to the first port and to the second port;
a second wavelength-conversion medium coupled to the first port and to the second port;
wherein:
a first signal received at the first port and having a first wavelength is converted to a second wavelength by the first and second wavelength-conversion mediums and is provided to the second port; and
a second signal received at the second port and having the second wavelength is converted to the first wavelength by the first and second wavelength-conversion mediums and is provided to the first port.

23. The wavelength-division multiplexing transponder of claim 22, wherein:
the first and second wavelength-conversion mediums convert the first wavelength to the second wavelength based on a direction that the first signal travels through the first and second wavelength-conversion mediums; and
the first and second wavelength-conversion mediums convert the second wavelength to the first wavelength based on a direction that the second signal travels through the first and second wavelength-conversion mediums.

24. The wavelength converter of claim 22, wherein at least one of the first and second wavelength-conversion mediums comprises a non-linear medium.

25. The wavelength converter of claim 24, wherein the at least one of the first and second wavelength-conversion mediums comprises periodically poled lithium niobate.

26. The wavelength-division multiplexing transponder of claim 22, wherein the wavelength-division multiplexing transponder comprises an all-optical wavelength-division multiplexing transponder.

* * * * *